Feb. 22, 1955 G. W. KESSLER 2,702,692
APPARATUS UTILIZING ULTRASONIC COMPRESSIONAL WAVES
Filed Nov. 24, 1951
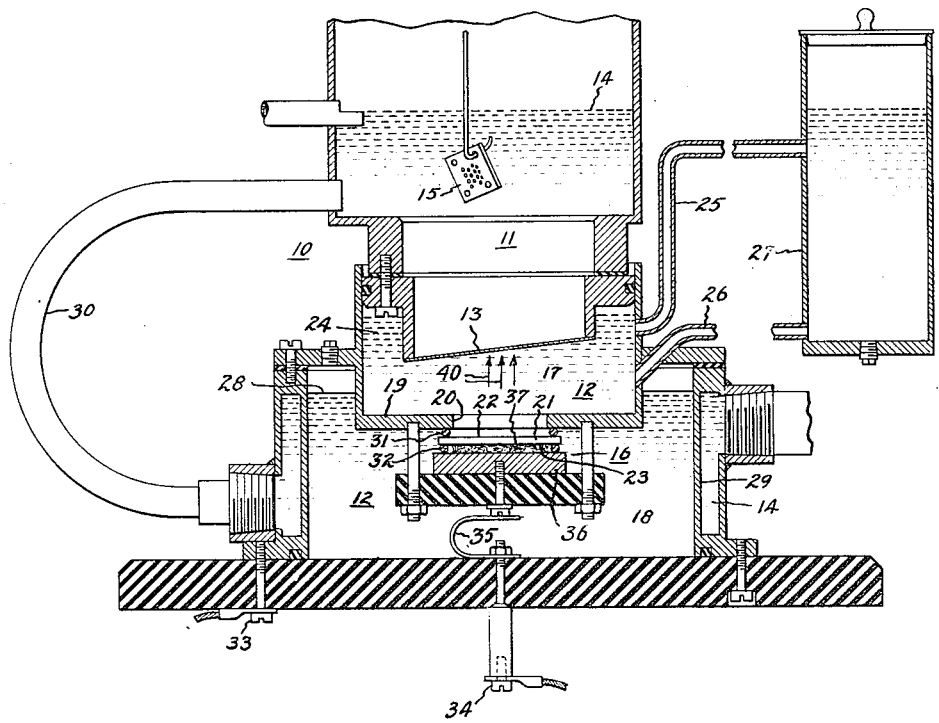
Inventor:
George W. Kessler,
by Paul G. Frank
His Attorney.

United States Patent Office 2,702,692
Patented Feb. 22, 1955

2,702,692

APPARATUS UTILIZING ULTRASONIC COMPRESSIONAL WAVES

George W. Kessler, Schenectady, N. Y., assignor to General Electric Company, a corporation of New York Application November 24, 1951, Serial No. 258,077

5 Claims. (Cl. 259—1)

My invention relates to apparatus employing high frequency "ultrasonic" compressional waves, and more particularly to apparatus for cleaning, impregnating or otherwise treating a fluid or solid material by subjection to ultrasonic compressional wave vibrations.

In many industrial applications of ultrasonic compressional wave energy, it is inconvenient or impractical to immerse the ultrasonic wave generating transducer within the compressional wave propagating medium that is in immediate effective contact with the substance or object to be treated. This is true, for example, in apparatus where the wave propagating medium is corrosive in nature so that vital components of an immersed transducer would be corroded or otherwise attacked by this medium. Similarly, where the wave propagating medium is electrically conductive in nature, an immersed electromechanical transducer would normally be short circuited by the medium. In such cases, the ultrasonic wave transducer is usually placed in a separate enclosed chamber or compartment, and wave energy directed perpendicularly through a suitable diaphragm in the wall of the chamber into the wave propagating medium which comprises, or is in immediate contact with, the substance to be treated.

This diaphragm must often be in the form of a sheet material, such as a corrosion-resistant metal, which has compressional wave transmission characteristics quite different from that of the wave propagating medium on one or both sides of the diaphragm. Under these conditions, considerable difficulty has been encountered in obtaining stable or efficient coupling of energy through the diaphragm. For single frequency compressional waves, it is found essential for reasonable efficiency that a diaphragm arranged perpendicular to the direction of propagation be located exactly a multiple of an effective half-wavelength away from the transducer. However, with high frequency transmission above 100 kilocycles, the wavelengths in most compressional wave propagating mediums are quite short, and the slightest deviation in transmission frequency or in the position of the diaphragm causes undesirable reflections and an intolerable decrease in efficiency evidenced by a tremendous increase in load on the ultrasonic generator.

Accordingly, one object of my invention is to provide an improved highly efficient material-treating apparatus of the type employing ultrasonic compressional waves transmitted through a diaphragm into a treating chamber of the apparatus.

Another object is to provide apparatus whereby ultrasonic compressional wave energy may be coupled through a diaphragm with stability, good efficiency and a minimum of reflected energy.

In general, in accord with the invention the diaphragm through which it is desired to couple or otherwise transmit compressional waves is arranged in an inclined or oblique fashion relative to the direction of the incident compressional waves rather than perpendicular thereto. The deviation in slope of the diaphragm away from a plane normal to the direction of incident waves is preferably at least two angular degrees. Sloping the diaphragm in this fashion produces a corresponding deflection of the compressional wave beam, but stability and efficiency of the energy coupling are considerably improved and reflections minimized.

The novel features which I believe characteristic of the invention are set forth in the appended claims. The invention itself, however, together with the further objects and advantages thereof can best be understood by reference to the following description taken in connection with the accompanying drawing in which the sole figure is a sectional view of an ultrasonic cleaner embodying the invention.

Referring to the drawing, I have shown the invention embodied in an ultrasonic cleaner 10 including two chambers 11 and 12 separated by a thin diaphragm 13. Chamber 11 is the cleaning chamber and is adapted to contain a suitable cleaning solution 14 such as trichlorethylene. The cleaning solution 14 comprises the compressional wave propagating medium that is in immediate effective contact with the objects 15 to be cleaned. Chamber 12 houses an electromechanical compressional wave generating transducer 16 illustrated as a piezoelectric type although magnetostrictive types may alternatively be employed. Chamber 12 is divided into two sections 17 and 18 by a partition 19 having a window 20 opening upon the compressional wave transmitting face of a flat wafer-like piezoelectric crystal 21 of transducer 16. Film-like electrodes 22 and 23 cover respective opposite major faces of crystal 21. Section 17 of chamber 12 is filled with an electrically-conducting compressional-wave-propagating medium 24, such as a saline water solution, and this saline solution is cooled by circulation through suitable fluid conduits 25 and 26 to a reservoir 27. Section 18 of chamber 12 is preferably filled with an insulating fluid 28, such as oil, in order to prevent arcing between electrodes 22 and 23 and to aid in the dissipation of heat from transducer 16. The insulating fluid 28 may be conveniently cooled by the circulation of the cleaning solution 14 through cooling tubes 29 in the wall of chamber 12 as shown. The cleaning solution is circulated through cooling tubes 29 and into the chamber 11 through a connecting conduit 30. The electrically conducting solution 24 in section 17 is prevented from intermingling with the insulating fluid 28 in section 18 of chamber 12 by virtue of suitable resilient O-rings 31 and 32 which also serve as a resilient mounting for crystal 21.

Voltage for driving piezoelectric crystal 21 is supplied between terminals 33 and 34. Terminal 33 constitutes the ground terminal and is electrically connected to electrode 22 of crystal 21 through saline solution 24 and the metallic wall of chamber 12, while terminal 34 constitutes the high voltage terminal and is connected through suitable electrically conductive linkage 35 to a contact disk 36, from which the electricity is conducted to electrode 23 of crystal 21 by virtue of a copper wool mesh 37 interposed between contact disk 36 and crystal 21. Mesh 37 serves to conduct electricity to crystal 21 without producing excessive damping or loading on the back face of the crystal. Crystal 21 may advantageously be a quartz crystal or a barium titanate ceramic slab polarized to have piezoelectric properties, and is preferably driven by an electric oscillator (not shown) to vibrate at a high ultrasonic frequency above 100 kilocycles, for example, 750 kilocycles. The wave length of such high frequency compressional waves is extremely short, and the diameter or area of the transmitting face of crystal 21 is, of course, a great many times larger than the wave length of the generated waves such that a broad directive beam of compressional wave energy is incident upon a correspondingly wide area of diaphragm 13.

Because of the corrosive nature of cleaning solution 14, it is essential that diaphragm 13 be composed of a corrosion-resistant material, preferably a metal, such as stainless steel. Diaphragm 13 must also be quite thin in the neighborhood of .002" in order that the diaphragm may vibrate at the high frequencies involved and function to transmit the compressional waves thereby. It will be appreciated that diaphragm 13 does not have the same compressional wave propagating characteristics as the fluid mediums 14 and 24 on each side thereof, and thus does not serve as a compressional wave transmission window in the manner of certain rubber compositions in underwater object location transducers. Diaphragm 13 couples the compressional wave energy between chambers 11 and 12 by its mechanical vibratory action rather than by merely acting as a transmission window for the waves.

Diaphragm 13 is arranged in an oblique plane relative to the direction of incident compressional waves received from transducer 16. In the drawing, diaphragm 13 is shown as being arranged in an oblique plane inclined five angular degrees from a horizontal plane; the direction of incident compressional wave propagation being illustrated by arrows 40 as being vertical. The inclination of the plane of diaphragm 13 is not critical but is preferably at least two angular degrees from the horizontal in order to achieve the advantages of the invention. The inclination of diaphragm 13 away from the horizontal is also preferably no greater than thirty angular degrees because the beam of incident compressional waves is deflected by the inclination of diaphragm 13; and with higher inclinations, the compressional wave energy is deflected toward a side wall of chamber 11 or toward an eccentric region of cleaning solution 14 rather than toward the more conveniently accessible central region thereof.

The improvement in efficiency of energy coupling between chambers 11 and 12 as well as the reduction in load upon the ultrasonic generator driving transducer 16 resulting from this oblique arrangement of diaphragm 13 is quite extraordinary. A five degree inclination of diaphragm 13 increases the compressional wave energy coupling from chamber 12 into chamber 11 by considerably more than 50% over that which exists when the diaphragm is normal to the direction of incident wave propagation. The load on the ultrasonic generator is also reduced by more than 50% and the transmission of energy into chamber 11 is both stable and substantially constant despite minor deviations in the frequency of the generated compressional waves.

The reason for this unexpected and rather extraordinary improvement when an obliquely arranged diaphragm is used rather than one parallel to the transmitting face of the transducer 16 is believed to be the result of a consequent reduction in the compressional wave energy reflected back upon transducer 16 from diaphragm 13. When diaphragm 13 is located in a plane normal to the incident compressional waves, the diaphragm must be exactly the proper distance away from the transducer 16 before compressional wave energy coupling through the diaphragm occurs. Any slight deviation from this critical distance or any slight deviation in frequency of the compressional wave transmission produces reflections of the compressional wave energy from the diaphragm rather than coupling therethrough. With diaphragm 13 parallel to the face of transducer 16, the energy is reflected directly back toward the transducer along its initial incident path and may rebound back and forth between diaphragm 13 and transducer 16. When diaphragm 13 is sloped in the manner of the invention, at least some of the compressional waves developed by transducer 16 reach the diaphragm in the proper phase to achieve energy coupling therethrough. In addition, any energy which is reflected back from the sloped diaphragm 13 either completely misses the transducer or is reflected again at a different angle toward the diaphragm and thus has a good probability of reaching the diaphragm in proper phase to augment the energy coupling therethrough. It is to be understood, however, that this explanation is presented only as a probable explanation of this unusual phenomena, and is not intended to limit the invention in any way if other explanations ultimately prove more accurate or comprehensive.

It is also to be understood that although I have shown the diaphragm 13 as being arranged in a single inclined plane, the diaphragm 13 may, in accord with the invention, be constructed to be inclined along more than one plane; for example, a conical, wedge-shaped or pyramid-type diaphragm may alternatively be employed. Moreover, although I have shown a particular embodiment of the invention, many modifications may be made, and I intend by the appended claims to cover all such modifications as fall within the true spirit and scope of the invention.

What I claim as new and desire to secure by Letters Patent of the United States is:

1. Ultrasonic compressional wave apparatus comprising two chambers separated at least in part by a diaphragm, an ultrasonic compressional wave generating transducer and a compressional wave propagating material within one chamber, said diaphragm having compressional wave propagating characteristics differing from that of said wave propagating material, said transducer being arranged to direct compressional wave energy through said medium toward an area of said diaphragm much larger than the wave length of said energy, said diaphragm being located at an oblique angle relative to the direction of incident wave energy from said transducer.

2. Ultrasonic compressional wave apparatus comprising two chambers separated in part by a thin metal diaphragm, an ultrasonic compressional wave generating transducer within one chamber, said transducer having a transmitting surface much larger than the wave length of its generated compressional waves and being arranged to propagate compressional wave energy from said surface toward at least a portion of said diaphragm, said diaphragm portion being inclined at an angle between 2 and 30 angular degrees from a direction perpendicular to the direction of incident wave energy from said transducer.

3. In high frequency compressional wave apparatus, a chamber having a diaphragm in a wall thereof, a high frequency compressional wave generating transducer within said chamber, said transducer being arranged to propagate high frequency compressional waves toward an area of said diaphragm much greater than the wave length of said waves, and said diaphragm having an oblique position relative to the directon of incident compressional waves from said transducer.

4. In ultrasonic compressional wave appartus, a chamber having a thin metal diaphragm in a wall thereof, an ultrasonic compressional wave generating transducer having within said chamber a flat energy-transmitting face much larger than the wave length of the generated waves, said transducer being arranged to propagate ultrasonic compressional waves toward said diaphragm and said diaphragm being supported in said wall in a position inclined between 2 and 30 angular degrees relative to the transmitting face of said transducer.

5. Ultrasonic compressional wave apparatus comprising two chambers, a dividing partition between said chambers including a thin metal diaphragm, an ultrasonic compressional wave generating transducer within one chamber arranged to propagate compressional wave energy toward an area of said diaphragm having at least one dimension much larger than the wave length of the generated ultrasonic waves, the plane of said diaphragm being inclined between 2 and 30 angular degrees from a plane perpendicular to the direction of incident waves from said transducer.

References Cited in the file of this patent

UNITED STATES PATENTS

| | | |
|---|---|---|
| 2,063,944 | Pierce | Dec. 15, 1936 |
| 2,163,650 | Weaver | June 27, 1939 |
| 2,500,008 | Richardson | Mar. 7, 1950 |

FOREIGN PATENTS

| | | |
|---|---|---|
| 654,673 | Germany | Dec. 24, 1927 |